United States Patent
Inui

(10) Patent No.: US 10,175,509 B2
(45) Date of Patent: Jan. 8, 2019

(54) SPECTACLE LENS

(71) Applicant: INUI LENS CO., LTD., Higashisumiyoshiku, Osaka (JP)

(72) Inventor: Yoshinori Inui, Higashisumiyoshiku (JP)

(73) Assignee: INUI LENS CO., LTD., Higashisumiyoshiku, Osaka (JP)

(*) Notice: Subject to any disclaimer, the term of this patent is extended or adjusted under 35 U.S.C. 154(b) by 8 days.

(21) Appl. No.: 15/467,244

(22) Filed: Mar. 23, 2017

(65) Prior Publication Data

US 2018/0210234 A1    Jul. 26, 2018

(30) Foreign Application Priority Data

Jan. 24, 2017   (JP) .................. 2017-010173

(51) Int. Cl.
| | | |
|---|---|---|
| *G02C 7/02* | (2006.01) | |
| *G02C 7/10* | (2006.01) | |
| *B29D 11/00* | (2006.01) | |
| *B29K 69/00* | (2006.01) | |
| *B29K 75/00* | (2006.01) | |

(52) U.S. Cl.
CPC ........ *G02C 7/105* (2013.01); *B29D 11/00432* (2013.01); *B29D 11/00923* (2013.01); *G02C 7/104* (2013.01); *B29D 11/00009* (2013.01); *B29D 11/0073* (2013.01); *B29K 2069/00* (2013.01); *B29K 2075/00* (2013.01); *B29K 2995/0021* (2013.01); *G02C 2202/16* (2013.01)

(58) Field of Classification Search
CPC .......... G02C 7/16; G02C 7/105; G02C 7/108; G02C 2202/16
USPC .................. 351/159.57, 159.62, 159.66
See application file for complete search history.

(56) References Cited

U.S. PATENT DOCUMENTS

| | | | | |
|---|---|---|---|---|
| 4,780,103 A * | 10/1988 | Minowa | .................... | D06P 3/00 351/159.04 |
| 5,502,516 A * | 3/1996 | Elterman | ................. | G02C 7/10 351/41 |
| 2017/0219742 A1* | 8/2017 | Baker | ...................... | G02B 1/14 |

* cited by examiner

*Primary Examiner* — Darryl J Collins

(74) *Attorney, Agent, or Firm* — Birch, Stewart, Kolasch & Birch, LLP

(57) ABSTRACT

A spectacle lens is produced through a first step of stacking a first member colored in cyan and a second member colored in red and integrating the first member and the second member, and a subsequent second step of partially polishing a periphery of a convex surface of the first member. Provision of the polishing step enables unique design and production of appropriate numbers of widely varied distinctive spectacle lenses.

3 Claims, 5 Drawing Sheets

B1=Cyan plastic
B2=Red plastic

B1=B2=Transparent

Double Molding
B2→(B2+B1)

B1=Transparent
B2=Red plastic

B1=Transparent

B1=Transparent

B1=Transparent

B1=Transparent

B1=Transparent

Double Molding
B1 → (B2+B1)

B1=Cyan plastic
B2=Transparent

B2=Transparent

B2=Transparent

B2=Transparent

B2=Transparent

B2=Transparent

SPECTACLE LENS

BACKGROUND OF THE INVENTION

1. Field of the Invention

The present invention relates to a spectacle lens enabling novel design.

2. Description of the Prior Art

Spectacle lens design is often featured mostly by the shapes of glassframes and decoration. Spectacle lenses have been researched only in terms of technical performance, such as being unlikely to flaw, reducing brightness, and the like. Some lenses may be provided on the surface with a protective film or an antireflection film, but have been less attractive in terms of design.

There have been known the inventions titled Lenses having chromatic effect (U.S. Pat. No. 6,916,095), Multi-layer lens particularly for sunglasses (U.S. Pat. No. 25,668,618), Aid for color vision deficiencies (U.S. Pat. No. 35,574,517), and the like. These inventions, however, relate to uniform design and do not achieve widely varied distinctive design.

US 2008/0151182 A1 discloses a technique of providing a lens surface with a complex camouflage pattern. This invention, however, needs to include a production step of providing the lens surface with a number of printing faces. Like those inventions mentioned above, this invention is thus unsuitable for production of widely varied distinctive commercial products.

SUMMARY OF THE INVENTION

In view of the above problem, an object of the present invention is to provide a spectacle lens enabling production of appropriate numbers of widely varied distinctive commercial products.

In order to achieve the object mentioned above, the present invention provides a spectacle lens including first and second plastic members having different tones and integrated with each other, the spectacle lens being produced through a first step of stacking a first member colored in a first tone and disposed outside so as not to face an eye, and a second member colored in a second tone and disposed inside so as to face the eye, and integrating the first member and the second member; and a second step of partially removing a peripheral surface portion of the lens having been processed in the first step, by causing a processing head to be in contact with or applying laser beams to a convex surface of the first member or a concave surface of the second member.

Provision of the second step enables unique design and production of appropriate numbers of widely varied distinctive spectacle lenses. The "colored" state in the present invention includes a state where the first member and the second member themselves are colored with a coloring agent or the like, as well as a state where the first member and/or the second member is provided, on at least one of front and rear surfaces, with a colored layer. Furthermore, examples of the "colored layer" include a printed layer, as well as an adhesive agent or a colored sheet layer provided on a joint surface between the first member and the second member.

DETAILED DESCRIPTION OF THE INVENTION

Embodiments of the present invention will be described in more detail below. FIGS. 1 to 4 are explanatory views of a first step of producing spectacle lenses 10 each including a first member B1 and a second member B2. These figures each depict a pair of lens members for left and right eyes.

Figure 1:
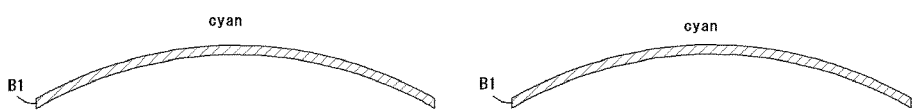
FIG. 1 is a sectional view depicting sectional shapes of first members.
Figure 2:
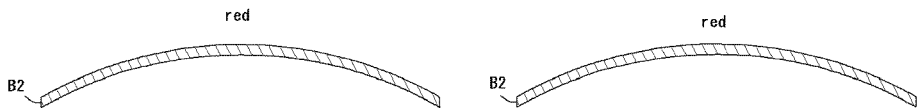
FIG. 2 is a sectional view depicting sectional shapes of second members.
Figure 4:
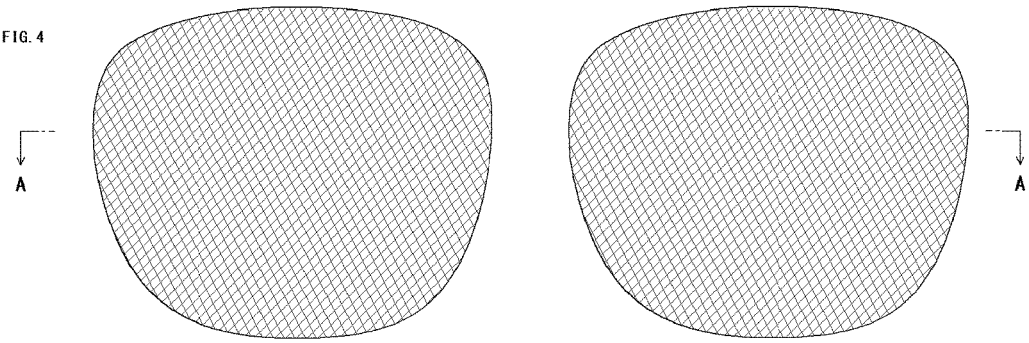
FIG. 4 is a plan view depicting planar shapes of the first members and the second members.

FIG. 1 is a sectional view depicting the first members B1, B1 provided outside so as not to face eyes. FIG. 2 is a sectional view depicting the second members B2, B2 provided inside so as to face eyes. The first members B1 and the second members B2 have planar shapes depicted in FIG. 4, and FIGS. 1 and 2 are sectional views taken along line A-A indicated in FIG. 4.

The first members B1 and the second members B2 are both made of a plastic material, preferred examples of which include an allyl diglycol carbonate resin such as CR-39, and a thermoplastic resin such as a polyurethane resin. The preferred examples also include an acrylic resin, a polycarbonate resin, and a thermosetting resin such as nylon.

The present embodiment nonlimitingly exemplifies the first members B1 and the second members B2 each having a uniform thickness of about 1 mm and an appropriately curved identical shape. The first members B1 and the second members B2 are colored in different tones. For example, the first members B1 are colored in cyan and the second members B2 are colored in red.

(1) A plastic raw material (typically a pellet) mixed with a coloring agent is heated and melted, or cast, to be molded. (2) A colored layer is printed or deposited on a transparent plastic member having been molded. (3) The molded transparent plastic member is immersed in a coloring tank to be dyed. The first members B1 and the second members B2 are colored in accordance with any one of these methods (1) to (3).

The embodiment, in which the plastic member is colored by means of printing, deposition, or dyeing, is applicable to a case where (a) the colored layer is provided only on a convex surface of the plastic member, a case where (b) the colored layer is provided only on a concave surface of the plastic member, and a case where (c) the colored layer is provided on both of convex and concave surfaces of the plastic member.

Figure 3:
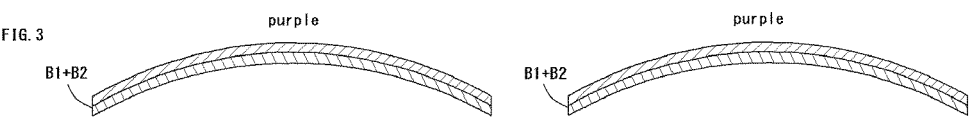
FIG. 3 is a sectional view of a state where the first members and the second members are integrated, respectively.

In a case where two types of plastic members are colored after being molded, the colored first members B1, B1 and the colored second members B2, B2 are integrated by means of an adhesive agent or the like, respectively, to complete spectacle lens for left and right eyes depicted in FIG. 3. The adhesive agent is typically thermally cured or UV cured.

In an exemplary step of coloring each of the two types of molded plastic members, (1) a colored layer in a first tone is provided on the convex surface of the first member B1 and/or on the concave surface of the first member B1, and (2) a colored layer in a second tone is provided on the convex surface of the second member B2 and/or the concave surface of the second member B2.

In alternative cases, (3) the colored layer in the first tone is provided on the convex surface of the first member B1, and the colored layer in the second tone is provided on the concave surface of the first member B1, and (4) the colored layer in the first tone is provided on the convex surface of the second member B2, and the colored layer in the second tone is provided on the concave surface of the second member B2.

In any one of these cases, the first member B1 and the second member B2 are bonded to be integrated with each other in a subsequent bonding step. The adhesive agent is cured by ultraviolet (UV) irradiation or the like.

The first members B1, B1 and the second members B2, B2 are not necessarily integrated by bonding. For example, after completing a first type of the plastic members, it is possible to adopt a double molding technique, such as a double injection method of stacking, on the first type of the plastic members, a second type of the plastic raw material being heated and melted and injection molding the raw material, or a double casting method of extrusion molding the second type of the plastic raw material.

According to the double molding technique, the second members B2, for example, are produced initially. The first members B1 are then molded on the cured second members B2. Specifically, a plastic raw material mixed with a red coloring agent is heated and melted to be molded, to obtain the second members B2. A plastic raw material mixed with a cyan coloring agent is subsequently heated and melted to be molded, the molded plastic material is stacked on the cured second members B2 to integrate the first members B1 and the second members B2, respectively.

Figure 5A:
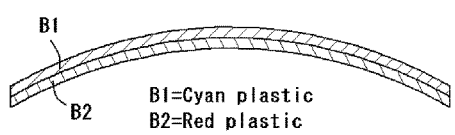
FIGS. 5A and 5B are views each depicting the first member and the second member being colored.

FIG. 5A depicts the spectacle lens 10 produced in accordance with this production method, having a sectional structure in which the first member B1 colored in the first tone and the second member B2 colored in the second tone are integrated with each other. Such a configuration is suitable for mass production of spectacle lenses of an identical tone model.

In order for production of distinctive spectacle lenses with more tone types and varied tone combinations, it is also preferred to provide a colored layer after double molding, not being limited to the above production method. In this case, both or either one of the first member B1 and the second member B2 is preferred to be uncolored (transparent) in order for increase in tone variation.

Figure 5B:
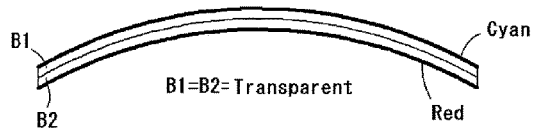

Initially described is the case where both the first member B1 and the second member B2 are transparent. In this case, in the subsequent coloring step, the colored layer in the first tone is provided on the convex surface of the first member B1 and the colored layer in the second tone is provided on the concave surface of the second member B2 (see FIG. 5B).

Provision of the colored layers after double molding enables much more tone combinations and production of appropriate numbers of spectacle lenses in distinctive tones.

Both the first member B1 and the second member B2 are not necessarily transparent, but only one of them can be transparent. In a case where the second member B2 is initially produced and the transparent first member B1 is molded on the cured second member B2, the colored layer in the first tone is provided on the convex surface of the first member B1 in the coloring step subsequent to double molding.

Figure 6A:
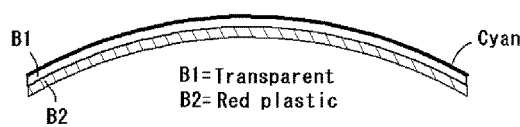
FIGS. 6A to 6F are views each depicting the first member and the second member being colored.
Figure 6B:
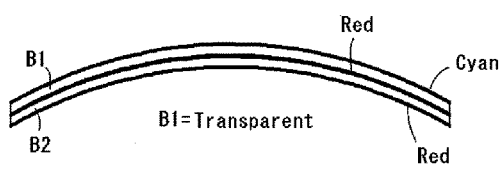
Figure 6C:
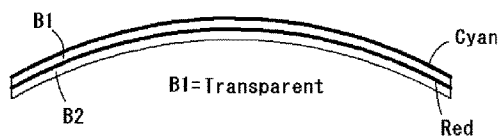
Figure 6D:
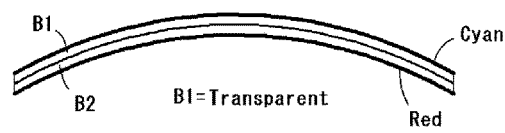

Such a procedure is applicable to a case where a plastic base material for the second member B2 is entirely colored in red (see FIG. 6A) and a case where a colored layer in red is already provided on the convex surface of the second member B2 and/or the concave surface of the second member B2 (see FIGS. 6B to 6D).

Figure 6E:
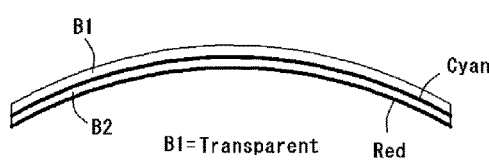
Figure 6F:
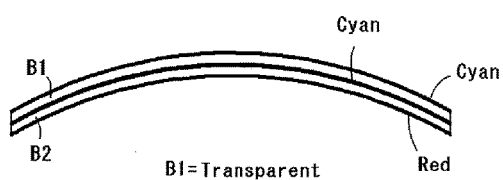

In a case, as depicted in FIG. 6E, where a colored layer in cyan is provided on the convex surface of the second member B2 and a colored layer in red is provided on the concave surface of the second member B2, there is no need to provide any colored layer on the first member B1. As depicted in FIG. 6F, a colored layer in cyan is optionally provided on the convex surface of the first member B1.

This production method including any one of these steps has an additional task such as printing, in order to provide a colored layer on the convex surface of the second member B2 and/or on the concave surface of the second member B2. This production method is still suitable for considerable increase in tone variation and production of appropriate numbers of spectacle lenses in distinctive tones.

There can be a case of initially producing the first member B1 and then molding the transparent second member B2 on the cured first member B1. In this case, the colored layer in the second tone is provided on the concave surface of the second member B2 in the coloring step subsequent to double molding.

Figure 7A:
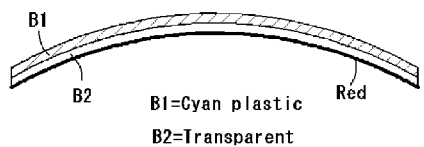
FIGS. 7A to 7F are views each depicting the first member and the second member being colored.
Figure 7B:
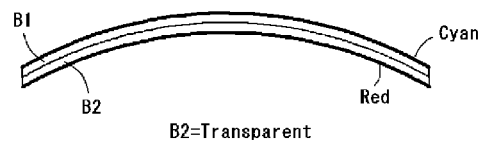
Figure 7C:
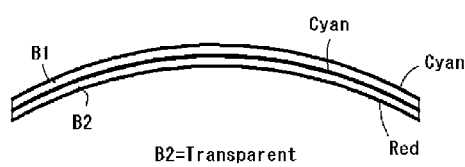
Figure 7D:
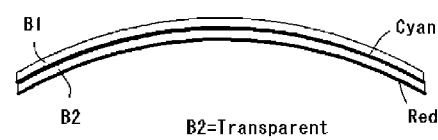

Such a procedure is applicable to a case where a plastic base material for the first member B1 is entirely colored in cyan (see FIG. 7A) and a case where a colored layer in cyan is already provided on the convex surface of the first member B1 and/or the concave surface of the first member B1 (see FIGS. 7B to 7D).

Figure 7E:
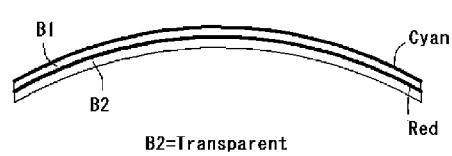
Figure 7F:
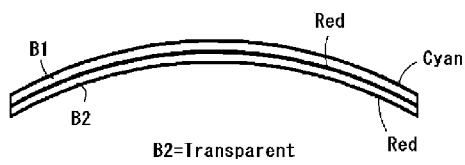

In a case, as depicted in FIG. 7E, where a colored layer in cyan is provided on the convex surface of the first member B1 and a colored layer in red is provided on the concave surface of the first member B1, there is no need to provide any colored layer on the second member B2. As depicted in FIG. 7F, a colored layer in red is optionally provided on the concave surface of the second member B2.

In any one of the cases depicted in FIGS. 5A to 7F, the first members are colored in the first tone and the second members are colored in the second tone in the integrated state depicted in FIG. 3. In an exemplary combination of cyan and red, the entire spectacle lens 10 appears to have uniform purple when viewed from outside. This spectacle lens 10 is thus sufficiently applicable to sunglasses. This spectacle lens 10 is, however, quite ordinary in design with no feature.

In view of this, the present embodiment further includes a second step of polishing to thin portions 10B and 10C in a peripheral surface portion of the spectacle lens 10. Polishing is performed preferably with use of a five-axis polisher including a polishing head to be in contact with a processed workpiece (spectacle lens), having a freely settable movement locus. The five-axis polisher according to the present embodiment includes the polishing head having a freely settable movement locus, and is thus configured to appropriately thin the peripheries of the spectacle lenses 10 having the double-layer structure depicted in FIG. 3.

Figure 8:
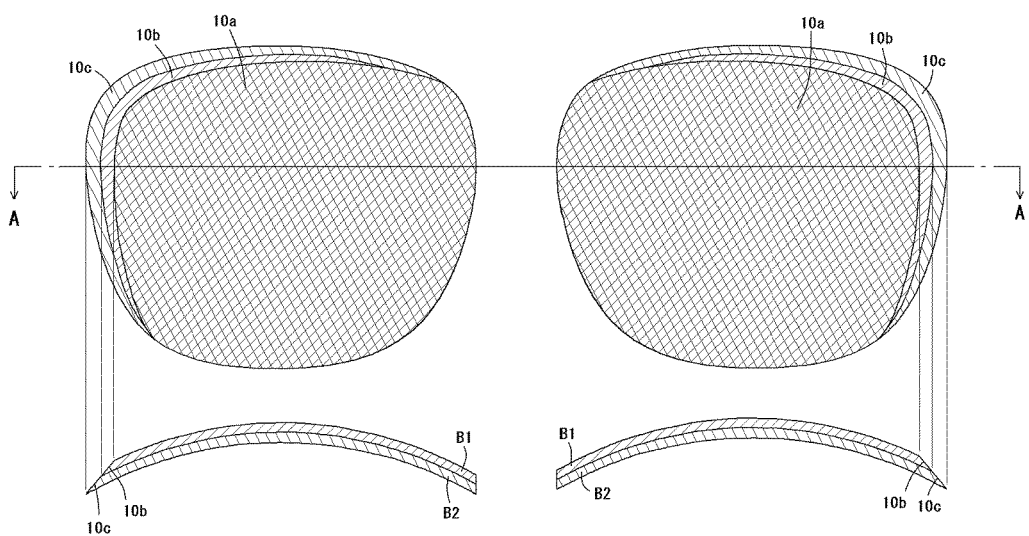
FIG. 8 is an explanatory view in a case of forming gradation portions in accordance with an oblique polishing method.

FIG. 8 illustrates an oblique polishing method of obliquely polishing the convex surfaces of the first members B1 so as not to cause the side surfaces of the first members B1 and the second members B2 to be perpendicular to the convex surfaces. The first members B1 according to the present embodiment are each produced by mixing the coloring agent with the plastic raw material to obtain the base material entirely having the first tone (see FIGS. 5A and 7A).

The first member B1 in the outermost portion 10C is completely removed in the present embodiment, so that the second tone (red) of the second member B2 appears in the outermost portion 10C of the spectacle lens 10. In the gradation portion 10B adjacent to a center portion 10A, the first member B1 is gradually thinned to achieve tone change from a third tone (purple) to the second tone (red) with the gradually decreasing the first tone (cyan).

As depicted, the gradation portion 10B and the outermost portion 10C each have a curved band shape, to provide significant design with no adverse effect to a user's visual field. The convex surface of the first member B1 is obliquely polished in this case. The concave surface of the second member B2 can alternatively be polished. This also applies to a straight polishing method described hereinafter, similarly to the oblique polishing method.

Figure 9:
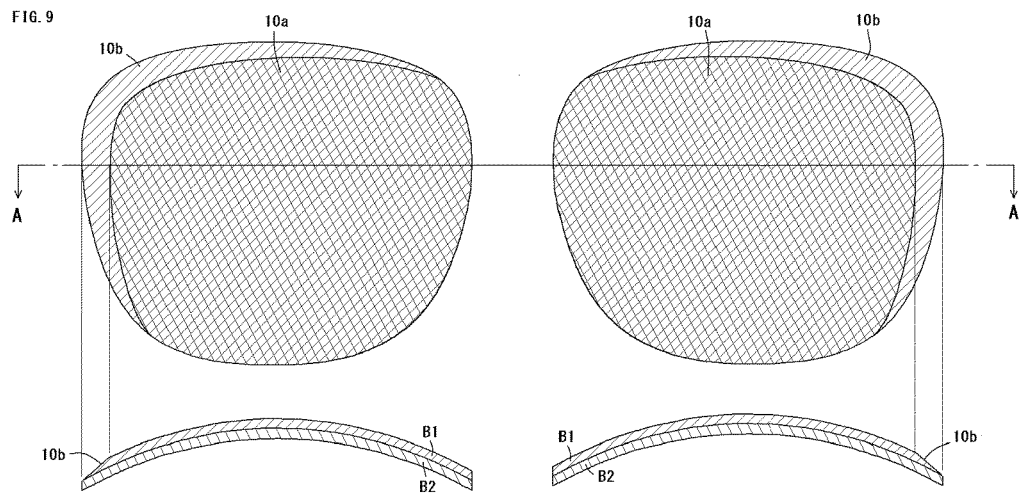
FIG. 9 is an explanatory view in a case of forming gradation portions in accordance with an oblique polishing method.

FIG. 9 depicts a state where only the peripheral portions 10B of the first members B1 are obliquely polished in accordance with the oblique polishing method as in the case depicted in FIG. 8. The second members B2 according to this embodiment are not exposed to outside, so that the gradation portions 10B adjacent to the center portions 10A of the spectacle lenses 10 each have a curved band shape having change from the third tone (purple) with the gradually decreasing the first tone (cyan).

Figure 10:
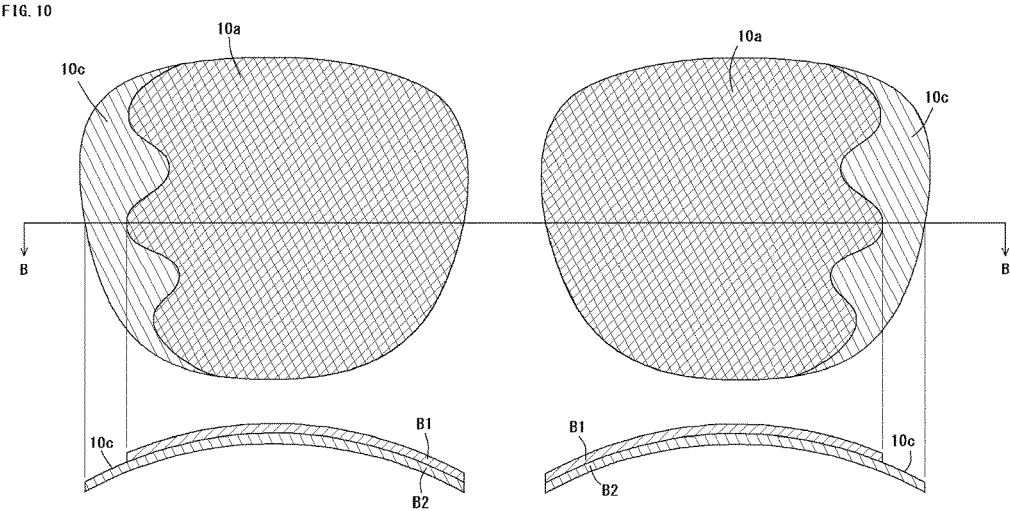
FIG. 10 is an explanatory view in a case of forming waved contour lines in accordance with a straight polishing method.

FIG. 10 illustrates the straight polishing method of polishing the convex surfaces of the first members B1 along the normal line so as to cause the side surface of the first member B1 to be substantially perpendicular to the convex surface. Polishing is performed along the normal line in this embodiment to remove the first members B1 or the colored layers of the first members B1. The tone of the second members B2 thus appears in the outer peripheral portions 10C, which have red clearly different from purple in the center portions 10A.

As depicted, the center portions 10A each have a waved contour line (border line) having inflection points. The present embodiment adopts the five-axis polisher including the polishing head to be in contact with a processed workpiece (spectacle lens), having a freely settable movement locus. It is thus possible to form a more complex contour line in addition to the waved contour lines depicted in FIG. 10. Such clear tone change with respect to the complex contour line will achieve significant design.

As in the configurations depicted in FIGS. 5A, 5B, 6A to 6D, 7A, 7B, 7E, and 7F, the embodiment including no provision of the colored layer in the first tone on the convex surface of the second member B2 preferably achieves the design of FIG. 10.

Particularly in the configurations other than those depicted in FIGS. 5A and 7A, the design of FIG. 10 is considerably preferably achieved with quite a small polishing amount for removal of the colored layer (see FIGS. 5B, 6A to 6D, 7B, 7E, and 7F).

Figure 11:
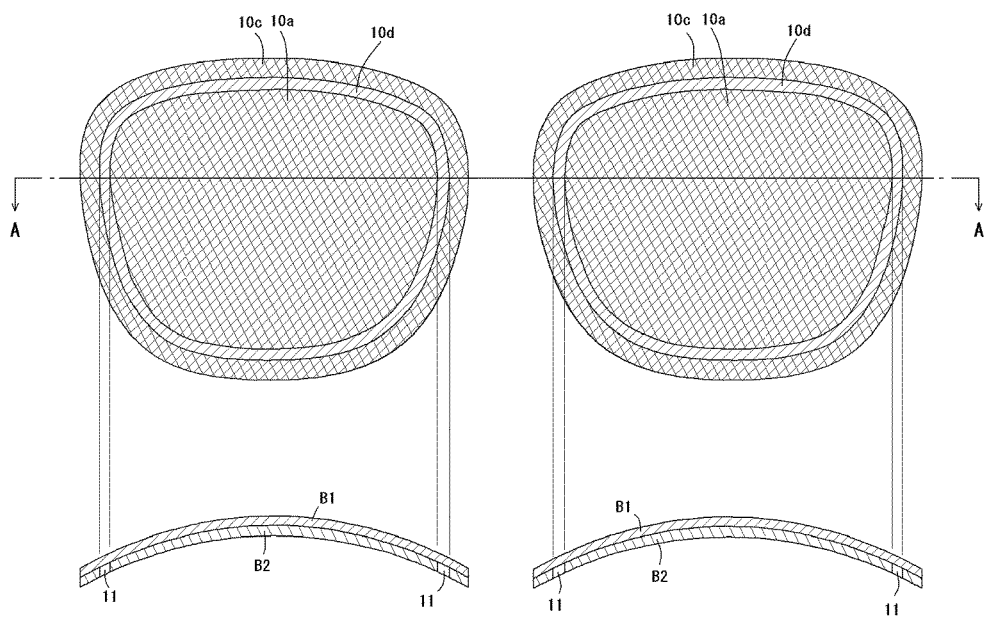
FIG. 11 is an explanatory view in a case of forming annular belt lines in accordance with the straight polishing method.

FIG. 11 relates to an embodiment in which the polishing head is made in contact with the concave surface of each of the second members B2 to provide a cut groove 11 having an annular band shape along the outer periphery of the second member B2. The annular band portion is cut off in the second member in the second tone (red) in this embodiment, to provide an annular groove (an annular band line) in the first tone (cyan) so as to achieve an impressive design.

In order to form an annular groove in the second tone (red), the polishing head is made in contact with the convex surface of the first member B1 to cut off an annular band portion along the outer periphery of the first member B1.

Regardless of whether the concave surface of the second member B2 or the convex surface of the first member B1 is polished, there is no need to particularly provide a continuous cutoff line. More impressive design is achieved with a discontinuous cutoff line.

When the concave surface of the second member B2 is polished, as in the configurations depicted in FIGS. 5B, 6D to 6F, and 7A to 7D, the embodiment including provision of the colored layer in the second tone only on the concave surface of the second member B2 made of the transparent plastic base material is considerably preferred in order to achieve the design of FIG. 11 with quite a small polishing amount for removal of the colored layer in the second tone.

When the convex surface of the first member B1 is polished, as in the configurations depicted in FIGS. 5B, 6A to 6D, 7B, 7E, and 7F, the embodiment including provision of the colored layer in the first tone only on the convex surface of the first member B1 made of the transparent plastic base material is considerably preferred in order to achieve the design of FIG. 11 with quite a small polishing amount for removal of the colored layer in the first tone.

In the case where the second member B2 is made of the plastic base material in the second tone as in the configurations depicted in FIGS. 5A and 6A, the gradation portion can be provided by forming an annular groove having a depth appropriately changed from the cut groove 11. In an embodiment including provision of the cut groove 11 with the polishing head made in contact with the concave surface of the second member B2, the deeper cut groove 11 has a tone closer to the first tone with the fewer second tone.

In another embodiment including provision of the cut groove 11 with the polishing head made in contact with the convex surface of the first member B1, the deeper cut groove 11 has a tone closer to the second tone with the fewer first tone.

The spectacle lens 10 is completed by executing the second step. Where appropriate, a protective film is provided on the outer surface or the inner surface of the spectacle lens. The two types of plastic members B1 and B2 can optionally be provided therebetween with a polarizing film.

The embodiments have been described in detail, in which the five-axis processor can be replaced with a laser processor. FIG. 10 illustrates the straight polishing method, which can be replaced with the oblique polishing method to provide the gradation portions 10B depicted in FIGS. 8 and 9. In this case, the gradation portions are provided outside the center portions 10A, continuously from the waved contour lines, to achieve impressive design.

The first member or the second member can be colored by integrating the first member and the second member with use of a colored adhesive agent. In a case where the first member is transparent, the first member is colored with the adhesive agent. In another case where the second member is transparent, the second member is colored with the adhesive agent.

What is claimed is:

1. A spectacle lens comprising first and second plastic members having different tones and integrated with each other, the spectacle lens being produced through
   - a first step of stacking a first member colored in a first tone and disposed outside so as not to face an eye, and a second member colored in a second tone and disposed inside so as to face the eye, and integrating the first member and the second member, and
   - a second step of partially removing a peripheral surface portion of the lens having been processed in the first step, by causing a processing head to be in contact with or applying laser beams to a convex surface of the first member or a concave surface of the second member,
   - wherein, in the second step, the peripheral surface portion of the lens is partially thinned toward a peripheral edge to provide a gradation portion having tone change.

2. The spectacle lens according to claim 1, wherein
   the gradation portion is provided thereoutside with the second member exposed outside or the first member exposed inside in a curved band shape.

3. The spectacle lens according to claim 1, wherein
   the gradation portion is provided thereoutside with a peripheral edge of the first member or a peripheral edge of the second member in a curved shape having an inflection point.

* * * * *